(12) United States Patent
Cilfone et al.

(10) Patent No.: US 10,423,497 B2
(45) Date of Patent: Sep. 24, 2019

(54) MECHANISM FOR REPRESENTING SYSTEM CONFIGURATION CHANGES AS A SERIES OF OBJECTS WRITABLE TO AN OBJECT STORAGE CONTAINER

(71) Applicant: International Business Machines Corporation, Armonk, NY (US)

(72) Inventors: Bart R. Cilfone, Marina del Rey, CA (US); Alan M. Frazier, Palatine, IL (US); Patrick A. Tamborski, Chicago, IL (US); Sanjaya Kumar, South Elgin, IL (US)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 15/824,876

(22) Filed: Nov. 28, 2017

(65) Prior Publication Data

US 2019/0166200 A1    May 30, 2019

(51) Int. Cl.
G06F 11/14    (2006.01)
G06F 3/06    (2006.01)

(52) U.S. Cl.
CPC ........ *G06F 11/1458* (2013.01); *G06F 3/0619* (2013.01)

(58) Field of Classification Search
CPC .............. G06F 3/0619; G06F 11/1458; G06F 11/1464; G06F 11/1469; G06F 11/1471
See application file for complete search history.

(56) References Cited

U.S. PATENT DOCUMENTS

| | | | |
|---|---|---|---|
| 4,092,732 A | 5/1978 | Ouchi | |
| 5,454,101 A | 9/1995 | Mackay et al. | |
| 5,485,474 A | 1/1996 | Rabin | |
| 5,774,643 A | 6/1998 | Lubbers et al. | |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Joseph R Kudirka
(74) *Attorney, Agent, or Firm* — Garlick & Markison; Timothy W. Markison; Patricia A. Markison

(57) ABSTRACT

A method includes generating an entry for inclusion in a configuration queue regarding a configuration submission regarding DSN managed by a managing unit that uses a manager's configuration database stored in a first database. The method further includes updating a first version of the configuration queue stored in first database and a second version of the configuration queue stored in a manager's vault to include the entry. When the manager's configuration database requires restoring, the method further includes copying a backup version of the manager's configuration database to the first database to create an initially restored manager's configuration database and establishing an association between the managing unit and the initially restored manager's configuration database. When associated, the method further includes accessing the second version, identifying configuration changes not included in the initially restored manager's configuration database, and updating the initially restored manager's configuration database to include the identified configuration changes.

14 Claims, 6 Drawing Sheets

(56) References Cited

U.S. PATENT DOCUMENTS

| | | | |
|---|---|---|---|
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,370,248 | B2 * | 5/2008 | Tapper ............... G06F 11/1662 714/6.32 |
| 7,636,724 | B2 | 12/2009 | de la Torre et al. |
| 10,025,673 | B1 * | 7/2018 | Maccanti ............. G06F 11/1458 |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma et al. |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula, Jr. |
| 2005/0132070 | A1 | 6/2005 | Redlich et al. |
| 2005/0144382 | A1 | 6/2005 | Schmisseur |
| 2005/0229069 | A1 | 10/2005 | Hassner |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll, Jr. |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters, III et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2015/0067295 | A1 | 3/2015 | Storm et al. |
| 2016/0342335 | A1 * | 11/2016 | Dey ..................... G06F 3/0607 |
| 2016/0364295 | A1 | 12/2016 | Abhijeet et al. |
| 2017/0123910 | A1 | 5/2017 | Abhijeet et al. |
| 2017/0160945 | A1 | 6/2017 | Kazi et al. |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Mondal, AS. et al.; "Object Based Schema Oriented Object Storage System for Supporting Heterogeneous Data"; 2016 International Conference on Advances in Computing, Communications and Informatics (ICACCI); Sep. 21-24, 2016; pp. 1025-1032.

Keller, A. et al.; "A Configuration Complexity Model and Its Application to a Change Management System"; IEEE Transactions on Network and Service Management, vol. 4, No. 1; Jun. 2007; pp. 13-27.

Anonymously; "Adaptive Locality Configuration"; http://ip.com/IPCOM/000249478D; Feb. 28, 2017; 3 pgs.

Anonymously; "Method and System for Space Reservation in an Object Storage System"; http://ip.com/IPCOM/000249295D; Feb. 15, 2017; 3 pgs.

(56) References Cited

OTHER PUBLICATIONS

Anonymously; "Enabling Quotas and Usage Metrics for Resource Management in Object Storage"; http://ip.com/IPCOM/000248629D; Dec. 22, 2016; 3 pgs.

* cited by examiner

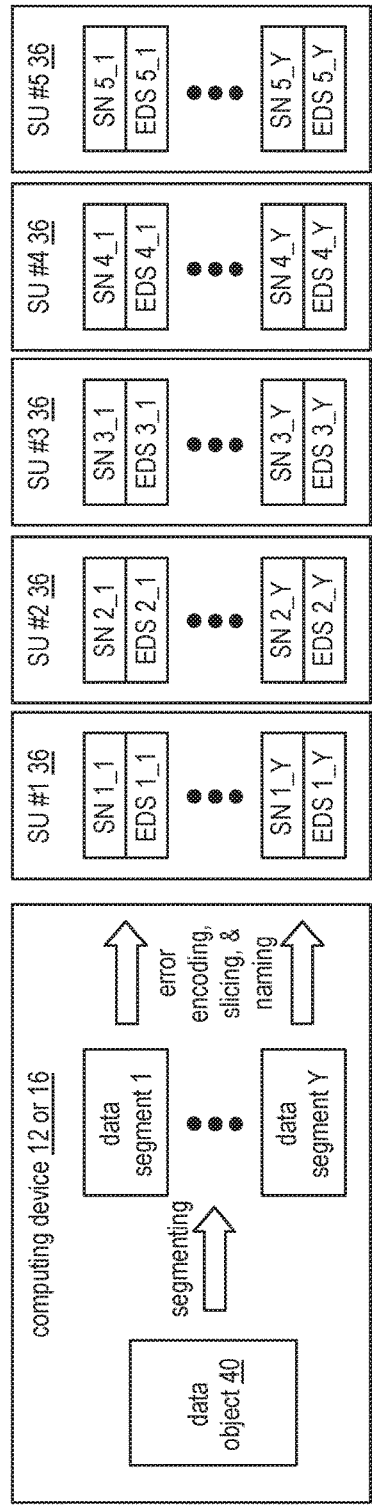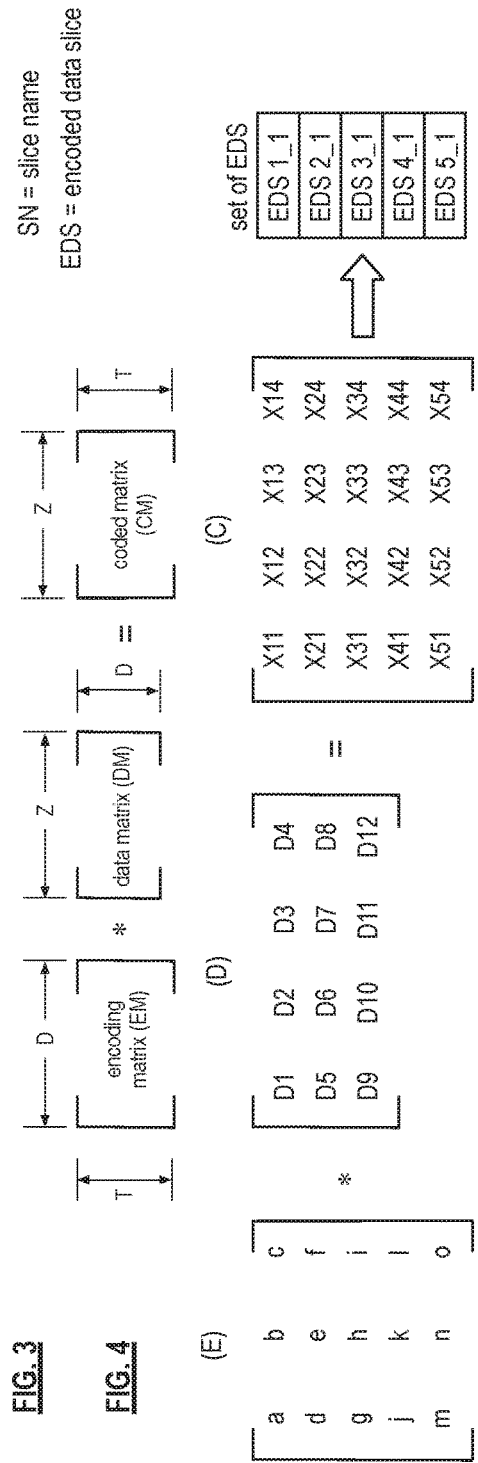
FIG. 3
FIG. 4
FIG. 5
FIG. 6 ized as desktop computers, servers, routers, switches, terminals, pagers, etc. Note that each of the user devices, the managing unit, and the integrity processing unit include a computing core, and thus, are computing devices. Note further that the term "computing device" as used herein may refer to any one or more of the user devices, the managing unit, the integrity processing unit, and/or a storage unit of the DSN memory.

MECHANISM FOR REPRESENTING SYSTEM CONFIGURATION CHANGES AS A SERIES OF OBJECTS WRITABLE TO AN OBJECT STORAGE CONTAINER

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

It is further known that a dispersed storage system administrator performs manager backups for system configuration changes. Consistent and/or frequent manager backups can cause significant burden on a dispersed storage system administrator.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
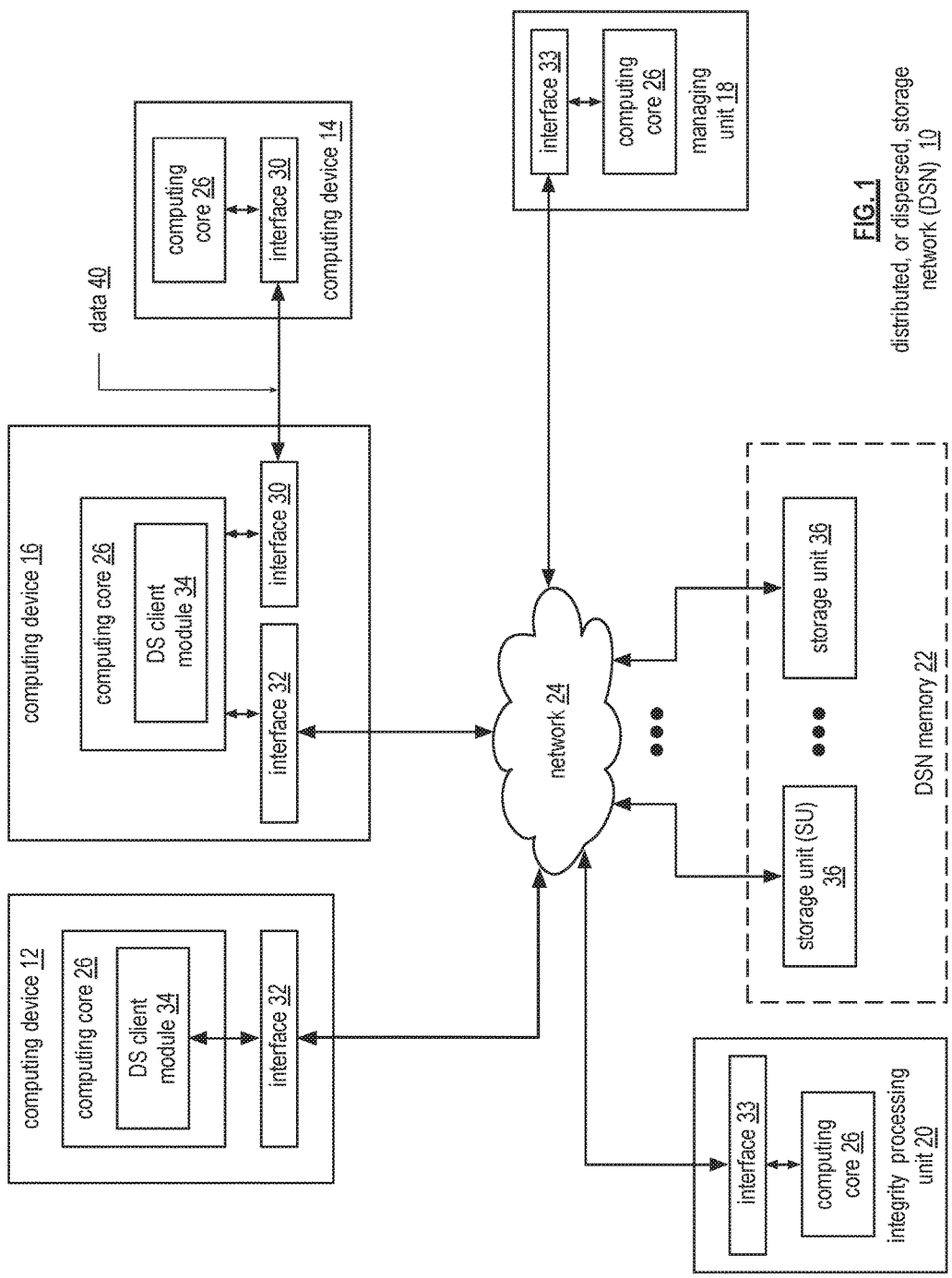
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
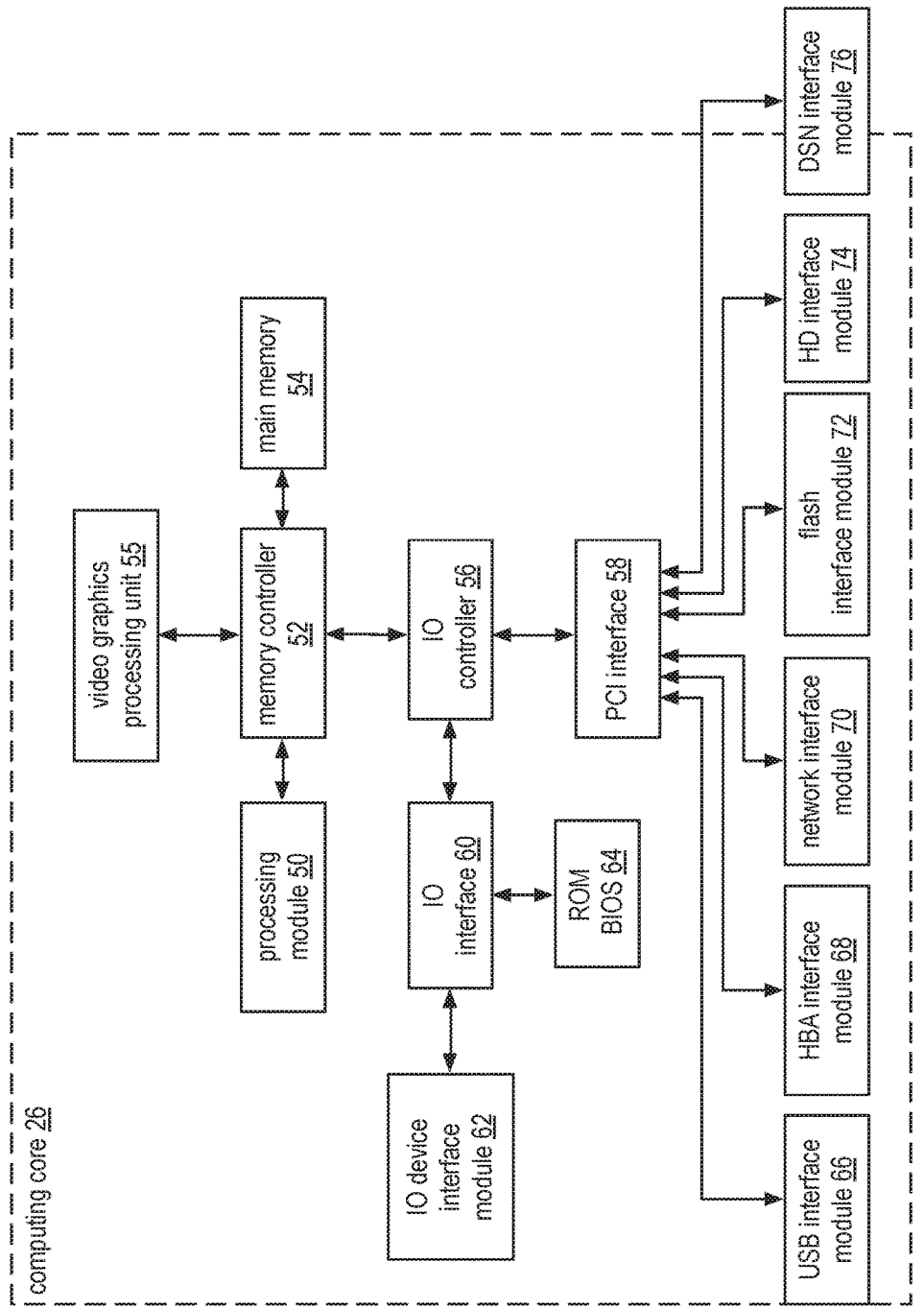
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSTN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSTN managing unit 18 tracks the number of times a user accesses a non-public vault and/or public vaults, which can be used to generate a per-access billing information. In another instance, the DSTN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSTN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
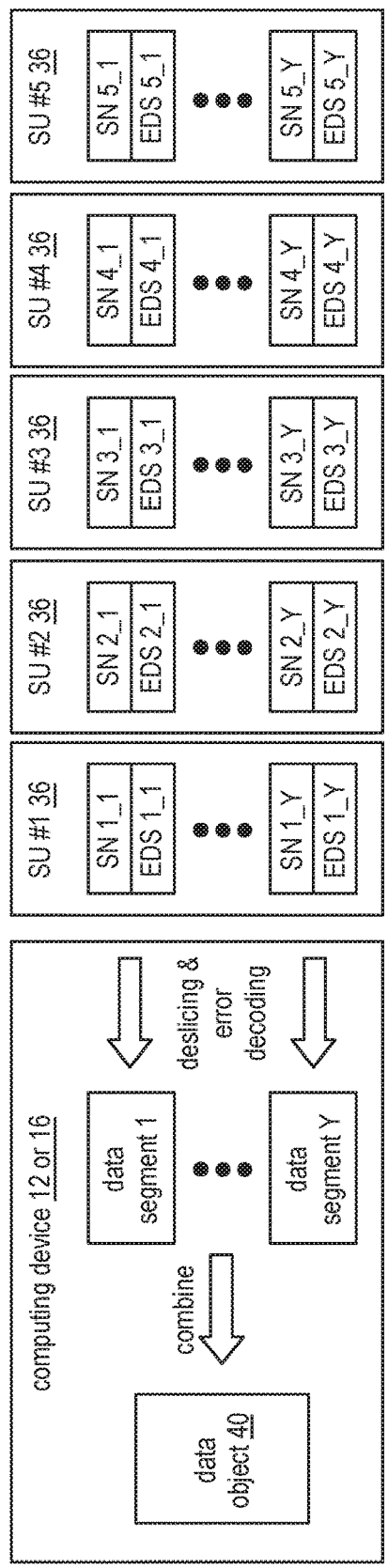
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
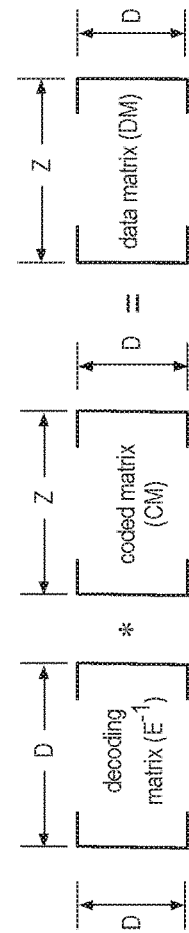
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
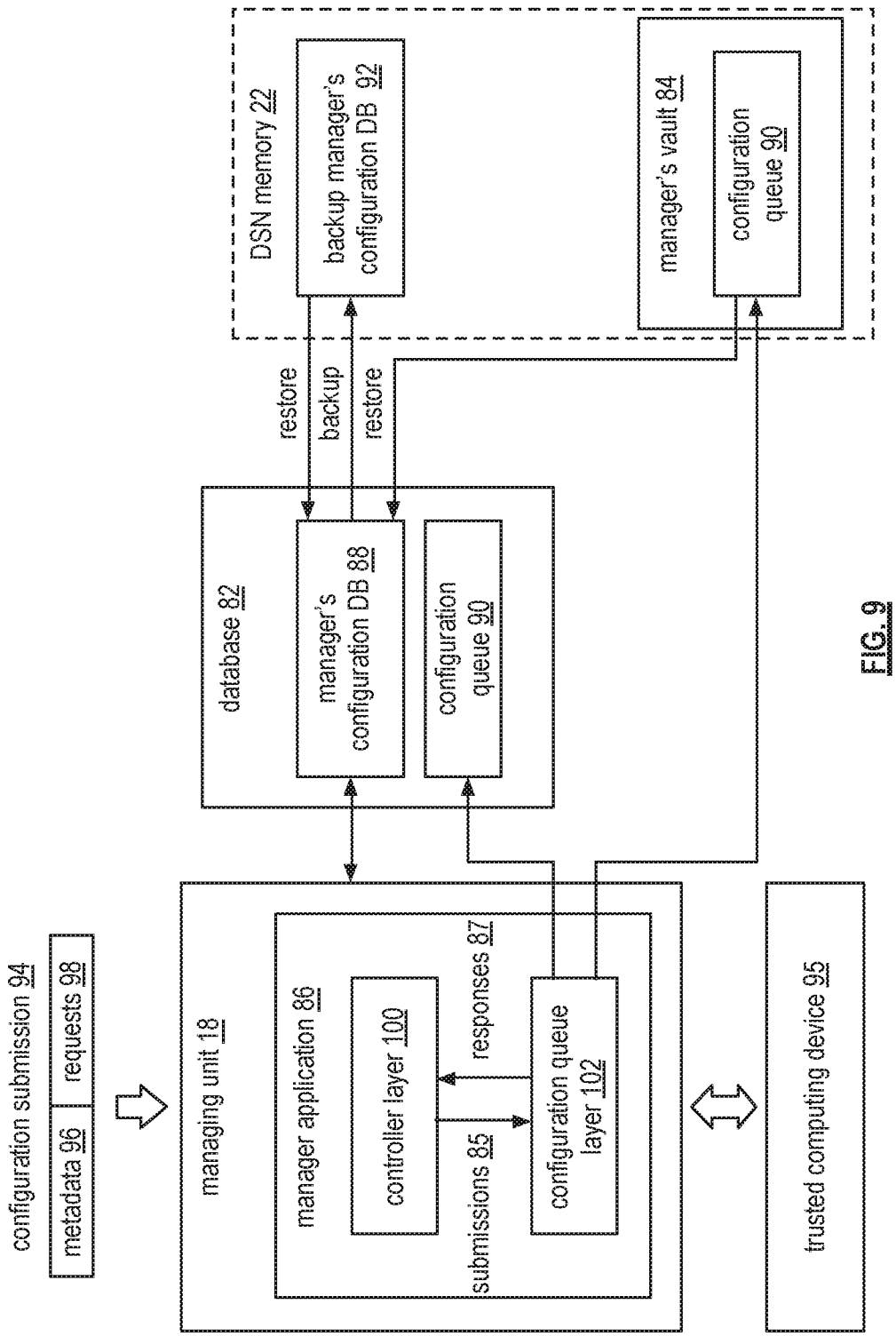
FIG. 9 is a schematic block diagram of an embodiment of an example of restoration of a manager's configuration database in accordance with the present invention.

FIG. 9 is a schematic block diagram of an embodiment of an example of restoration of a manager's configuration database that includes managing unit 18, database 82, dispersed storage network (DSN) memory 22, and trusted computing device 95. Trusted computing device 95 is a computing device of the DSN that possesses the required credentials and/or certificates to perform functions within the system shown (e.g., access managing unit 18). Managing unit 18 includes manager application 86 which includes a controller layer 100 and a configuration queue layer 102. Managing unit 18 uses a manager's configuration database 88 stored in database 82 to facilitate managing of at least a portion of the DSN. Database 82 includes attributes for fast, reliable, and non-dispersed error encoded data storage (e.g., database 82 is a reliable, web-based database) and stores configuration queue 90 along with manager's configuration database 88. DSN memory 22 stores a backup version of the manager's configuration database (e.g., backup manager's configuration database (DB) 92) as a plurality of sets of encoded backup slices and includes manager's vault 84. Manager's vault 84 stores configuration queue 90 as a plurality of sets of encoded data slices. Alternatively, backup version of the manager's configuration database 92 may be stored in a non-DSN memory location. The managing unit 18 allows assignment of the manager's vault 84 at an access pool level, storage pool (group) level, and/or a per-device level.

In an example of operation, the managing unit 18 obtains configuration submission 94 via user interface and/or an application programming interface (API) of manager application 86 and generates an entry for inclusion in configuration queue 90 regarding configuration submission 94. Configuration submissions are regarding configuration changes to at least a portion of the DSN managed by the managing unit 18. Configuration submission 94 includes configuration metadata 96 and a list of requests 98. Configuration metadata 96 includes one or more of a timestamp, a request identifier (ID), and identity of the party making the configuration change. The list of requests 98 are regarding execution of the configuration change and include one or more likely user requests (e.g., creation, updating, and deletion of vaults, accounts, groups, etc.) and/or one or more key requests (e.g., device approval, storage pool creation, actions in an administrative section, etc.).

In an example of generating the entry for inclusion in configuration queue 90, the controller layer 100 of the manager application 86 creates the entry in a data object structure required for a particular configuration queue 90. For example, the controller layer 100 creates a configuration submission entry with a unique sequential number identification and a payload (i.e., the configuration submission) encoded in an open standard file format (e.g., a JavaScript Option Notation (JSON) blob format) for entries to be included in the configuration queue 90 stored in database 82. As another example, the controller layer 100 dispersed storage error encodes the entry for inclusion in the configuration queue 90 stored manager's vault 84.

The managing unit 18 updates configuration queue 90 stored in database 82 to include the entry in the correct format and updates the configuration queue 90 stored in manager's vault to include the entry stored as stored as a plurality of sets of encoded data slices. For example, the controller layer 100 submits entries for inclusion in configuration queue 90 (e.g., submissions 85) to the configuration queue 90 via the configuration queue layer 102 and waits for responses 87 to be returned. The responses 87 will indicate whether the entry was included in the configuration queue successfully or whether inclusion failed (e.g., an error message is received indicating that the entry is in the wrong format). An entry inclusion may fail when attempting to write the entry to the manager's vault 84 while the manager's vault 84 is inaccessible. In that instance, the response 87 may indicate to retry the write at a given time (e.g., every 5 minutes) until the write succeeds. If a configuration change results in a newly created item (e.g., a new vault) the controller layer 100 can redirect to configure the view page for the newly created item.

The manager application 86 may include a modified application interface (API) to ensure that tagging of vaults and devices work in an expected and clean way with the configuration queue 90. The modified API is more clear in that when tagging an item, the tag values (e.g., "mytag") are passed to the API rather than a meaningless primary key tag id (e.g. "4").

Instead of performing a backup operation on the manager's configuration database 88 for every configuration change, the managing unit 18 can perform backups (e.g., update the backup manager's configuration database 92 stored in the DSN) at a scheduled and/or triggered time (e.g., nightly, after a key configuration change, etc.). If the need for database 82 restoration arises, the managing unit 18 is operable to restore stored changes from the latest backup file (e.g., backup manager's configuration database 92) stored in the DSN memory and any configuration changes made between the time the backup file was created and the time of restoration will be recreated based on the entries in the configuration queue 90 of manager's vault 84.

For example, when restoration of database 82 is required (e.g., database 82 is corrupted, missing data, etc.), trusted computing device 95 and/or managing unit 18 copies backup manager's configuration database 92 to database 82 to create an initially restored manager's configuration database. Trusted computing device 95 and/or managing unit 18 establishes an association between the managing unit 18 and the initially restored manager's configuration database.

As an example of establishing the association, trusted computing device 95 and/or managing unit 18 receives an indication from the initially restored manager's configuration database that the managing unit 18 is the managing unit of record and that the managing unit of record includes the manager's vault 84. The managing unit 18 and/or the trusted computing device 95 generates a certificate allowing the initially restored manager's configuration database permission to access the manager's vault 84. As another example, the manager application 86 installs a recovery identity for use by the managing unit 18 as both its client and server mode certificate. Manager application 86 will use the same certificate to associate the initially restored manager's configuration database (e.g., via S3 over HTTPS) with the managing unit 18. The recovery identity is granted read-only access to the manager's vault 84 as soon as the manager's vault 84 was created, prior to the backup or restore ever taking place. This recovery identity has no credentials created for it until after the restore takes place, in which case the managing unit 18 uses a new randomly generated key to create a recovery certificate signed by the internal certification authority (CA) certificate (e.g., from the backup file) and with a special subject distinguished name (DN) (e.g., CN=dsNet Recovery).

When the managing unit 18 is associated with the initially restored manager's configuration database, trusted computing device 95 and/or managing unit 18 accesses the configuration queue 90 from the manager's vault 84. The trusted computing device 95 and/or managing unit 18 identifies configuration changes from a recovered version of the configuration queue 90 that have not been included in the initially restored manager's configuration database. The trusted computing device 95 and/or managing unit 18 updates the initially restored manager's configuration database to include the identified configuration changes to produce a restored manager's configuration database. When the manager's configuration database 88 is restored the managing unit 18 and/or a trusted computing device return the managing unit 18 to an online state.

When the managing unit 18 is not associated with the initially restored manager's configuration database, an error message is returned. If there is an error during the recovery phase of the restore where the managing unit 18 is unable to read from the manager's vault 84 or is unable to re-apply the configuration changes to the manager's configuration database 88, then the managing unit 18 will not come online and will instead report errors to any client that attempts to use the user interface (UI) or application interface (API).

Figure 10:
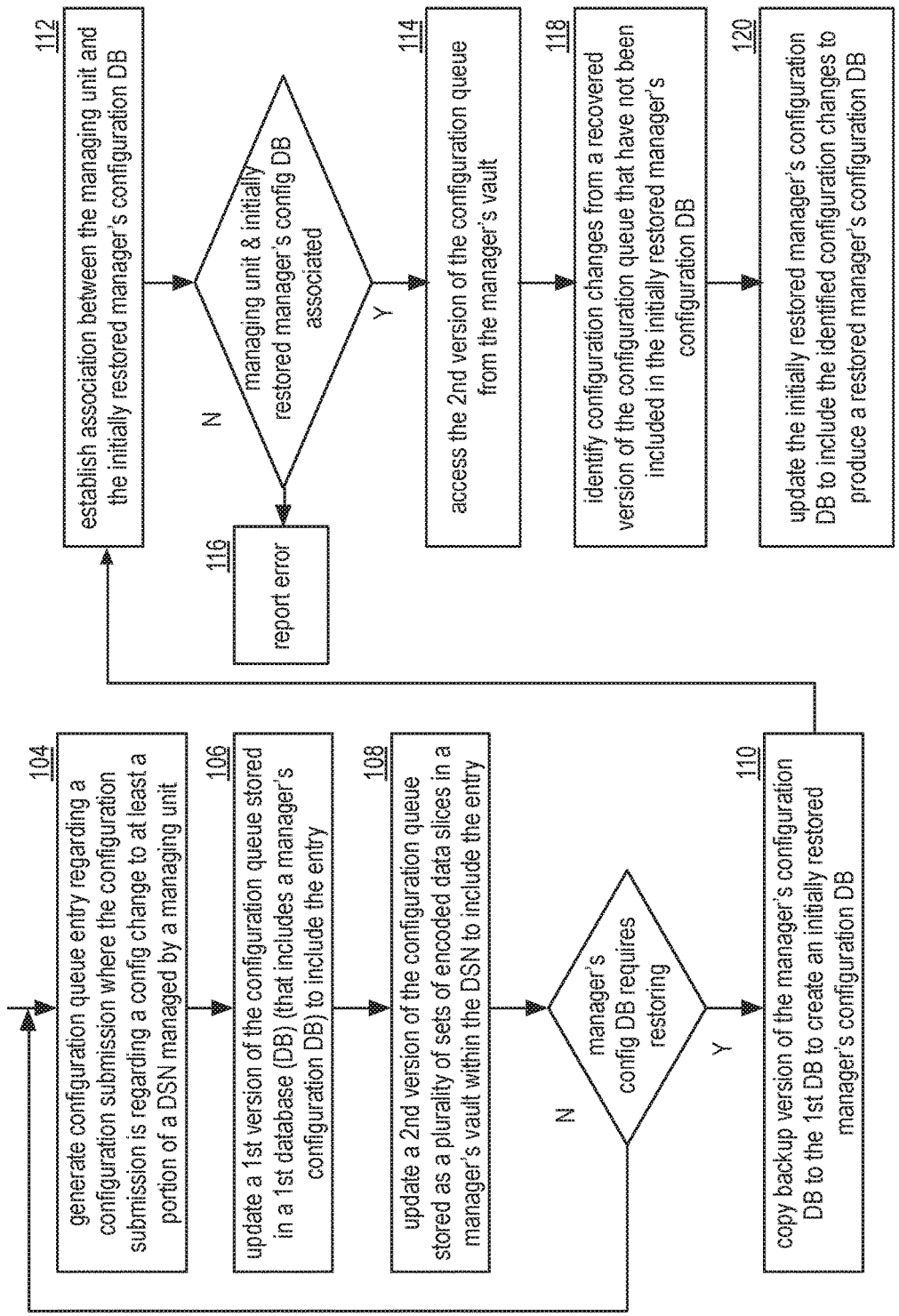
FIG. 10 is a logic diagram of an example of a method of restoration of a manager's configuration database in accordance with the present invention.

FIG. 10 is a logic diagram of an example of a method of restoration of a manager's configuration database. The method begins with step 104 where a managing unit of a dispersed storage network (DSN) generates an entry for inclusion in a configuration queue regarding a configuration submission. The configuration submission is regarding a configuration change to at least a portion of the DSN managed by the managing unit. A configuration submission includes configuration metadata and a list of requests. Configuration metadata includes one or more of a timestamp, a request identifier (ID), and identity of the party making the configuration change. The list of requests is regarding execution of the configuration change and include one or more likely user requests (e.g., creation, updating, and deletion of vaults, accounts, groups, etc.) and/or one or more key requests (e.g., device approval, storage pool creation, actions in an administrative section, etc.).

The managing unit uses the manager's configuration database to facilitate managing of at least a portion of the DSN. The manager's configuration database is stored in a first database that includes attributes for fast, reliable, and a non-dispersed error encoded storage (e.g., the first database is a reliable, web-based database). The first database is backed up to produce a backup version of the manager's configuration database. The backup version of the manager's configuration database is stored in DSN memory of the DSN as a plurality of sets of encoded backup slices or in one or more other memory devices.

The method continues with step 106 where the managing unit updates a first version of the configuration queue to include the entry. The first version is stored in the first database. The method continues with step 108 where the managing unit updates a second version of the configuration queue to include the entry. The second version is stored as a plurality of sets of encoded data slices in a manager's vault within the DSN.

When the manager's configuration database stored in the first database requires restoring, the method continues to step 110 where a computing device of the DSN copies the backup version of the manager's configuration database to the first database to create an initially restored manager's configuration database. The computing device is a trusted computing device of the DSN and/or the managing unit. The trusted computing device possesses the required credentials and/or certificates to perform functions of the manager's configuration database restoration (e.g., access the managing unit, etc.). When the manager's configuration database stored in the first database does not require restoring, the method branches back to step 104 where the managing unit continues to generate configuration queue entries for configuration submissions received.

The method continues with step 112 where the computing device (e.g., the trusted computing device (e.g., a computing device of the DSN that possesses the required credentials and/or certificates to access the necessary devices and data) and/or the managing unit) establishes an association between the managing unit and the initially restored manager's configuration database. For example, the computing device (e.g., the trusted computing device and/or the managing unit) receives an indication from the initially restored manager's configuration database that the managing unit is the managing unit of record and that the managing unit of record includes the manager's vault. The computing device (e.g., the trusted computing device and/or the managing unit) generates a certificate allowing the initially restored manager's configuration database permission to access the manager's vault.

When the managing unit is associated with the initially restored manager's configuration database, the method continues with step 114 where the computing device (e.g., the trusted computing device and/or the managing unit) accesses the second version of the configuration queue from the manager's vault. The method continues with step 116 where the computing device (e.g., the trusted computing device and/or the managing unit) identifies configuration changes from a recovered version of the configuration queue that have not been included in the initially restored manager's configuration database. The method continues with step 118 where the computing device (e.g., the trusted computing device and/or the managing unit) updates the initially restored manager's configuration database to include the identified configuration changes to produce a restored manager's configuration database.

When the manager's configuration database is restored, the managing unit and/or a trusted computing device return the managing unit to an online state. When the managing unit is not associated with the initially restored manager's configuration database, the method continues with step 116 where an error message is returned.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
generating, by a managing unit of a dispersed storage network (DSN), an entry for inclusion in a configuration queue regarding a configuration submission, wherein the configuration submission is regarding a configuration change to at least a portion of the DSN managed by the managing unit, wherein the managing unit uses a manager's configuration database to facilitate managing of the at least a portion of the DSN, wherein the manager's configuration database is stored in a first database, and wherein the first database is backed up to produce a backup version of the manager's configuration database;
updating, by the managing unit, a first version of the configuration queue to include the entry, wherein the first version of the configuration queue is stored in the first database;
updating, by the managing unit, a second version of the configuration queue to include the entry, wherein the second version of the configuration queue is stored as a plurality of sets of encoded data slices in a manager's vault within the DSN;
when the manager's configuration database stored in the first database requires restoring:
copying, by a computing device of the DSN, the backup version of the manager's configuration database to the first database to create an initially restored manager's configuration database;
establishing, by the computing device, an association between the managing unit and the initially restored manager's configuration database;
when the managing unit is associated with the initially restored manager's configuration database:
accessing, by the computing device, the second version of the configuration queue from the manager's vault;
identifying, by the computing device, configuration changes from a recovered version of the configuration queue that have not been included in the initially restored manager's configuration database; and
updating, by the computing device, the initially restored manager's configuration database to include the identified configuration changes to produce a restored manager's configuration database.

2. The method of claim 1 further comprises:
copying, by the computing device, the backup version of the manager's configuration database to the first database, wherein the computing device is one or more of a trusted computing device and the managing unit.

3. The method of claim 1 further comprises:
when the manager's configuration database is restored, returning, by the computing device, the managing unit to an online state, wherein the computing device is one or more of a trusted computing device and the managing unit.

4. The method of claim 1, wherein the configuration submission comprises:
configuration metadata that includes one or more of a timestamp, a request identifier (ID), and identity of the party making the configuration change; and
a list of configuration requests regarding execution of the configuration change.

5. The method of claim 1, wherein the establishing the association between the managing unit and the initially restored manager's configuration database comprises:
receiving, by the computing device, an indication from the initially restored manager's configuration database that the managing unit is the managing unit of record and that the managing unit of record includes the manager's vault; and
generating, by the computing device, a certificate allowing the initially restored manager's configuration database permission to access the manager's vault.

6. The method of claim 1 further comprises:
storing, by the managing unit, the manager's configuration database in the first database in a format supported by the first database, wherein the first database includes attributes for fast, reliable, and a non-dispersed error encoded storage of data.

7. The method of claim 1 further comprises:
storing, by the managing unit, the backup version of the manager's configuration database in DSN memory of the DSN as a plurality of sets of encoded backup slices.

8. A computer readable storage device comprises:
a first memory element that stores operational instructions that, when executed by a managing unit of a dispersed storage network (DSN), causes the managing unit to:
generate an entry for inclusion in a configuration queue regarding a configuration submission, wherein the configuration submission is regarding a configuration change to at least a portion of the DSN managed by the managing unit, wherein the managing unit uses a manager's configuration database to facilitate managing of the at least a portion of the DSN, wherein the manager's configuration database is stored in a first database, and wherein the first database is backed up to produce a backup version of the manager's configuration database;
update a first version of the configuration queue to include the entry, wherein the first version of the configuration queue is stored in the first database;
update a second version of the configuration queue to include the entry, wherein the second version of the configuration queue is stored as a plurality of sets of encoded data slices in a manager's vault within the DSN;
a second memory element that stores operational instructions that, when executed by a computing device of the DSN, causes the computing device to:
when the manager's configuration database stored in the first database requires restoring:
copy the backup version of the manager's configuration database to the first database to create an initially restored manager's configuration database;
establish an association between the managing unit and the initially restored manager's configuration database;
when the managing unit is associated with the initially restored manager's configuration database:
access the second version of the configuration queue from the manager's vault;
identify configuration changes from a recovered version of the configuration queue that have not been included in the initially restored manager's configuration database; and update the initially restored manager's configuration database to include the identified configuration changes to produce a restored manager's configuration database.

9. The computer readable storage device of claim 8, wherein the second memory element further stores operational instructions that, when executed by the computing device, causes the computing device to:
copy the backup version of the manager's configuration database to the first database, wherein the computing device is one or more of a trusted computing device and the managing unit.

10. The computer readable storage device of claim 8, wherein the second memory element further stores operational instructions that, when executed by the computing device, causes the computing device to:
when the manager's configuration database is restored, return the managing unit to an online state, wherein the computing device is one or more of a trusted computing device and the managing unit.

11. The computer readable storage device of claim 8, wherein the configuration submission comprises:
configuration metadata that includes one or more of a timestamp, a request identifier (ID), and identity of the party making the configuration change; and
a list of configuration requests regarding execution of the configuration change.

12. The computer readable storage device of claim 8, wherein the second memory element further stores operational instructions that, when executed by the computing device, causes the computing device to establish the association between the managing unit and the initially restored manager's configuration database by:
receiving an indication from the initially restored manager's configuration database that the managing unit is the managing unit of record and that the managing unit of record includes the manager's vault; and
generating a certificate allowing the initially restored manager's configuration database permission to access the manager's vault.

13. The computer readable storage device of claim 8, wherein the first memory element further stores operational instructions that, when executed by the managing unit, causes the managing unit to:
storing the manager's configuration database in the first database in a format supported by the first database, wherein the first database includes attributes for fast, reliable, and a non-dispersed error encoded storage of data.

14. The computer readable storage device of claim 8, wherein the first memory element further stores operational instructions that, when executed by the managing unit, causes the managing unit to:
store the backup version of the manager's configuration database in DSN memory of the DSN as a plurality of sets of encoded backup slices.

\* \* \* \* \*